United States Patent [19]

Tiller

[11] 4,452,079

[45] Jun. 5, 1984

[54] ACOUSTIC TACHOMETER

[75] Inventor: Charles R. Tiller, Glenview, Ill.

[73] Assignee: Cooper Industries, Inc., Houston, Tex.

[21] Appl. No.: 424,090

[22] Filed: Sep. 27, 1982

[51] Int. Cl.$^3$ .......................... G01P 3/02; G01P 3/42
[52] U.S. Cl. ....................................... 73/488; 73/506; 73/518; 324/160
[58] Field of Search ..................... 73/488, 506, 518; 324/160, 166

[56] References Cited

U.S. PATENT DOCUMENTS

| | | | |
|---|---|---|---|
| 2,174,176 | 9/1936 | Journeaux et al. | 73/51 |
| 2,425,811 | 6/1942 | Kent | 171/95 |
| 2,679,629 | 3/1950 | Hellar, Jr. | 324/78 |
| 3,029,385 | 8/1959 | Steinbrenner et al. | 324/77 |
| 3,289,077 | 7/1963 | Miller | 324/70 |
| 3,400,578 | 9/1968 | Frarey et al. | 73/116 |
| 3,815,426 | 6/1974 | Rohner | 73/488 |
| 4,126,045 | 11/1978 | Chou | 73/488 |
| 4,173,896 | 11/1979 | Takama | 73/518 |
| 4,334,422 | 6/1982 | Kawai et al. | 73/35 |

OTHER PUBLICATIONS

Johnson and Hilburn, "Rapid Practical Designs of Active Filters", p. 141, (1975).

Primary Examiner—James J. Gill
Attorney, Agent, or Firm—Fitch, Even, Tabin & Flannery

[57] ABSTRACT

An acoustic tachometer for diesel engines includes a microphone which is responsive to the sounds generated by the engine combustion occurrences. The microphone signal is passed through a band-pass filter having a variable center frequency which is determined by a control signal from a sweep generator. The control signal has a known relationship to the operating speed of the engine. As the band-pass filter is swept through its frequency spectrum, a peak detector identifies the signals of maximum amplitude, which occur at the fundamental frequency of the combustion occurrences. The control signal voltage at the maximum amplitude and hence at the fundamental frequency is stored. At the end of each sweep, the stored control signal voltage is fed to an oscillator having a frequency which is dependent upon the stored control signal voltage, and is related to revolutions per minute (RPM). The output of the oscillator excites a counter-display circuit which displays the operating speed in RPM. In an alternate embodiment, the stored control signal voltage is connected to a second band-pass filter having a variable center frequency which is dependent upon the stored control signal voltage. The microphone signal is fed through the second filter, which passes only the fundamental frequency to a clipper and phase locked loop, from which is driven a counter and digital display showing RPM. Error detection circuitry alerts the operator if the sound to the microphone is inadequate or excessive for accurate measurement.

17 Claims, 9 Drawing Figures

ACOUSTIC TACHOMETER

BACKGROUND OF THE INVENTION

1. Field Of The Invention

This invention relates to an apparatus and method for measuring the operating speed of devices having rotating parts, and more particularly, to acoustic tachometers for diesel engines and the like.

2. Description Of The Prior Art

Tachometers for gasoline internal combustion engines are generally connected to the electrical system of the engine. Temporary installation for engine servicing and the like is relatively simple, and may be accomplished by clipping leads to the distributor points. Since diesel engines do not have points or spark plugs, tachometers are generally connected to a moving part of the engine such as a gear, cam shaft or the like. This is often not practical for temporary installations as may be needed, for example, for setting the idle speed and governor speed, or for performing other service functions.

Optical tape may be permanently secured to the flywheel of a diesel engine for measuring engine speed with an optical tachometer. Additional mechanical connections are not needed for servicing, but the tape may be damaged fairly quickly from normal wear, and the operator must work fairly close to the engine fan to make measurements, which is sometimes dangerous.

Acoustic tachometers have been used to determine revolutions per unit time, or the operating speed, of diesel engines and other devices. Such tachometers are particularly adaptable to diesel engines where the fundamental frequency component of the sound generated by the engine combustion occurrences can be isolated from the harmonic components of the combustion occurrence sounds, and the other sounds generated by the engine, and ambient noise.

Acoustic tachometers may include a vibration pickup or other transducer affixed to a part of the engine for converting mechanical vibrations to corresponding electrical signals. In Miller U.S. Pat. No. 3,289,077 a transducer is secured to a fuel injection valve which vibrates at a frequency proportional to the speed of a diesel engine. In Takama U.S. Pat. No. 4,173,896 a sensor block is secured to a fuel line, and responds to changes in the fuel line pressure to produce signals from which engine speed may be determined. In either case, the mechanical connection requires time for installation, and readings may be inaccurate if installation is improper.

It is also known to utilize a microphone placed near a rotating device for detecting the speed of rotation of the device. Rohner U.S. Pat. No. 3,815,426 discloses a device for measuring the speed of rotation of a false-twisting machine from the center frequency of the narrow band level peak of the sonic and ultrasonic spectrum produced by the machine. A directional microphone picks up the machine sounds and converts them to corresponding electrical signals. A fixed band-pass filter with a bandwidth of 5 to 50 kHz filters these signals. The highest amplitude signals in this range are isolated by the adjustable threshold level of a Schmitt trigger circuit. The trigger circuit then produces uniform pulses at the rate of the signals at the highest amplitude. Such pulses are then counted per unit time to indicate rotational speed of the machine. One difficulty with the device is that the discrimination level is not automatically adjusted to a level just below the peak and consequently may accept any loud noises that exceed the discrimination level used, even though not at the frequency of the true peak. Furthermore, as the filter passes frequencies over a relatively wide range, the many frequencies present in the range may produce superimposed or composite signals exceeding the discrimination level even though not individually above the level. Another difficulty is that the threshold level must be recalibrated if the microphone is moved significantly during operation.

Frarey et al. U.S. Pat. No. 3,400,578 discloses an engine analyzer, as for high speed turbojet engines, in which nondirective microphones pick up radiated acoustic energy from the engine under test and produce corresponding electrical signals. The electrical signals are filtered with a band-pass filter having a center frequency corresponding to the reference speed of the engine part being tested. The filtered signal is applied to a phase lock detector having a voltage controlled oscillator (VCO) which then produces a signal at a relatively pure frequency corresponding to the frequency of the principal signal passing the filter. A control channel provides a signal dependent upon the output frequency of the VCO, which signal is applied to a balanced modulator along with the amplified output of the microphone. The modulated signal is filtered and amplified and then detected to provide an indication of the amplitude of the microphone output at the frequency of interest. A difficulty with this analyzer is that it requires a narrow band for the band-pass filter in order to reject unwanted signals, and therefore, is intolerant of such major variations in engine speed as would cause the desired signal to fall outside the pass band.

Thus, there is a need for an acoustic tachometer for diesel engines and the like which is accurate over a relatively wide range of engine speeds and yet is not mechanically connected to the engine, and may be operated at a safe distance from the engine. There is also a need for an acoustic tachometer which measures operating speed at various distances from the engine without the need for making manual adjustments.

Accordingly, one aspect of this invention is to provide a new and improved method and apparatus for measuring the operating speed of devices having rotating parts.

Another aspect is to provide a new and improved acoustic tachometer for diesel engines and the like.

Still another aspect is to provide a new and improved acoustic tachometer for diesel engines which is responsive to the fundamental frequency component of the sound generated by the engine combustion occurrences.

A still further aspect is to provide an acoustic tachometer having error detection circuitry which identifies erroneous readings caused by excessive or inadequate acoustic inputs.

Yet another aspect is to provide an acoustic tachometer which is operable over a range of distances from the engine, without making manual adjustments.

A further aspect is to provide a band-pass filter having a variable center frequency and a substantially constant bandwidth over a frequency spectrum of interest.

SUMMARY OF THE INVENTION

In keeping with one aspect of this invention, an acoustic tachometer, as for diesel engines and the like, includes a microphone or other suitable device which is responsive to the sounds generated by the engine combustion occurrences and produces corresponding electrical signals of frequencies and amplitudes systematically related thereto. The fundamental frequency of such electrical signals occurs in a frequency spectrum of interest which is functionally related to a known range of engine revolutions per minute (RPM). The electrical signal generated by the microphone, which may be amplified if desired, is passed through a band-pass filter having a variable center frequency which is determined by a control signal from a sweep generator. The control signal has a known relationship to frequency. As the band-pass filter is swept through the frequency spectrum of interest, a peak detector identifies the frequency at which the signals passed by the filter have the maximum amplitude. This corresponds to the fundamental frequency of the combustion occurrences which is linearly related to RPM. The control signal voltage at such frequency is identified and stored. At the end of each sweep, the stored control signal voltage is applied to an oscillator having a frequency which is dependent upon the stored control signal voltage, and hence corresponds to RPM. The output of the oscillator is applied to a counter-display circuit which displays a visual indication of the engine RPM. Error detection circuitry alerts the operator if the sound to the microphone is inadequate or excessive, that is, too soft or too loud. In an alternate embodiment, the stored control signal voltage is connected to a second band-pass filter having a variable center frequency which is dependent upon the stored control signal voltage. The microphone signal is fed through the second filter, which passes only a narrow band of frequencies centered at the fundamental frequency. The passed signals are applied to a clipper and a phase locked loop, which drives a counter and digital display for indicating RPM.

BRIEF DESCRIPTION OF THE DRAWINGS

The above mentioned and other features of this invention and the manner of obtaining them will become more apparent, and the invention itself will be best understood by reference to the following description of a preferred embodiment of the invention, particularly when taken in conjunction with the accompanying drawings, in which.

DESCRIPTION OF THE PREFERRED EMBODIMENTS

The acoustic tachometers shown in the drawings measure the revolutions per unit time, or operating speed, of a device. The device generates sound waves having components at a number of frequencies, and the frequency at which the sound waves are a maximum is systematically or functionally related to operating speed. In a diesel engine, the fundamental frequency of the sound generated by the combustion occurrences has a greater amplitude than the higher harmonic components of the combustion occurrence sounds and the other sounds generated by the engine. For this reason, the tachometers of this invention are particularly adaptable to and are directed towards use with diesel engines, although other uses are contemplated.

The frequency spectrum of interest over which the tachometers of this invention operate when used on a diesel engine is functionally related to the number of cylinders and range of RPM over which the engine operates. An automotive diesel engine generally has 4, 6 or 8 cylinders. The frequency range is generally the same for each engine size, although the RPM for a particular frequency changes. Commercially available engines have a frequency of cylinder firing in a range between about 20 Hz and 200 Hz. In that frequency range, the speed of an 8 cylinder engine ranges between about 300 and 3000 RPM. A 6 cylinder engine ranges between about 400 and 4000 RPM, and a 4 cylinder engine ranges between about 600 and 6000 RPM. If a tachometer is adaptable for use on any of 4, 6 and 8 cylinder engines, as in the apparatus described herein, the frequency spectrum of interest is about 20–200 Hz.

Figure 1:
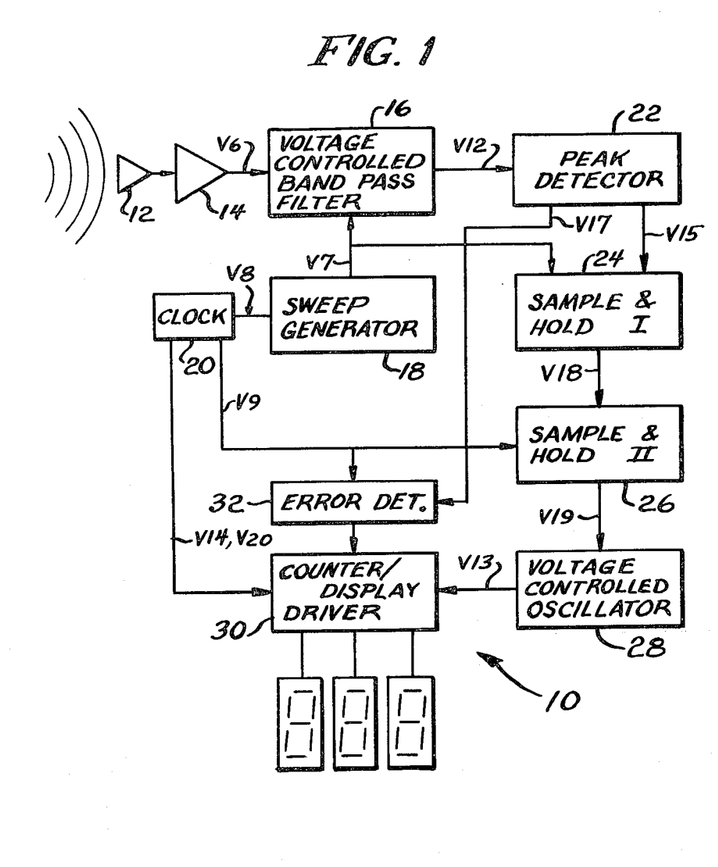
FIG. 1 is a block diagram of one embodiment of an acoustic tachometer in accordance with the present invention.

The tachometers of this invention determine operating speed from the sounds generated by the engine as detected by a microphone 12 (FIG. 1). There is no mechanical connection to the moving parts of the engine, and the tachometer may be operated up to several feet from the engine without adjusting internal voltage levels and the like. A voltage controlled band-pass filter 16 having a relatively narrow pass band sweeps the frequency spectrum of interest under the direction of a sweep generator 18. The filter 16 eliminates many extraneous noises which might otherwise cause erroneous readings. The detection signal from the microphone 12 is applied to the filter 16. As the filter 16 sweeps, a peak detector 22 detects the amplitude of the filtered detection signal and compares it to a stored voltage corresponding to the maximum amplitude previously detected in the respective sweep. If the detected amplitude is greater than that represented by the stored voltage, a voltage corresponding to a new maximum amplitude is stored, and the peak detector 22 produces an output pulse which is fed to a sample and hold circuit 24, which stores the sweep generator control voltage each time it receives a peak detector pulse.

At the end of each sweep, the control voltage stored in the sample and hold circuit 24 corresponds to the frequency at which the maximum amplitude was produced during the respective sweep and is related to the operating speed of the engine. This control voltage is then stored in a second sample and hold circuit 26. The voltage stored in the sample and hold circuit 26 controls the frequency of a voltage controlled oscillator 28. The output pulses of the oscillator 28 are counted and an indication of their frequency is displayed by a counter-display driver 30 as engine RPM.

In this description, typical component values are shown in parentheses. Resistor values are designated in ohms, and capacitors in microfarads, unless otherwise indicated. Manufacturer's designations are given for some solid state devices. "High" refers to a digital high, and "low" refers to a digital low.

In a unit actually made, several commercially available integrated circuits were used which each includes several components of the circuit. The switches 70, 102, 104 and the like in FIGS. 4A-4D may be included in several National Semiconductor CD4016M/CD4016C Quad Bilateral Switches. Discrete components could be used, if desired. Amplifiers 118, 120 may be RCA CA3080 amplifiers or the like.

Figure 4A:
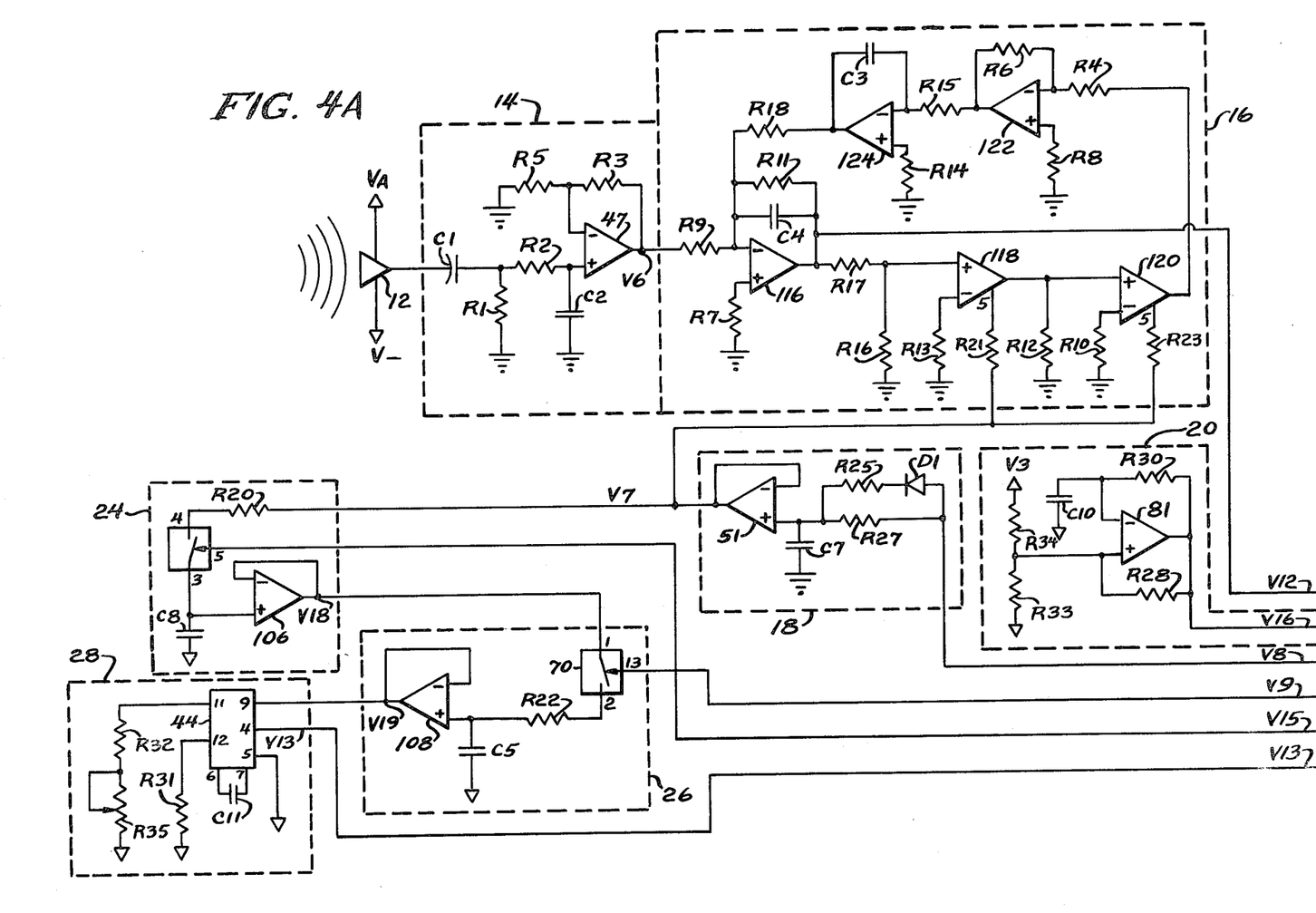
FIGS. 4A—4D constitute a schematic diagram of a preferred form of the tachometer shown in FIG. 1.
Figure 4B:
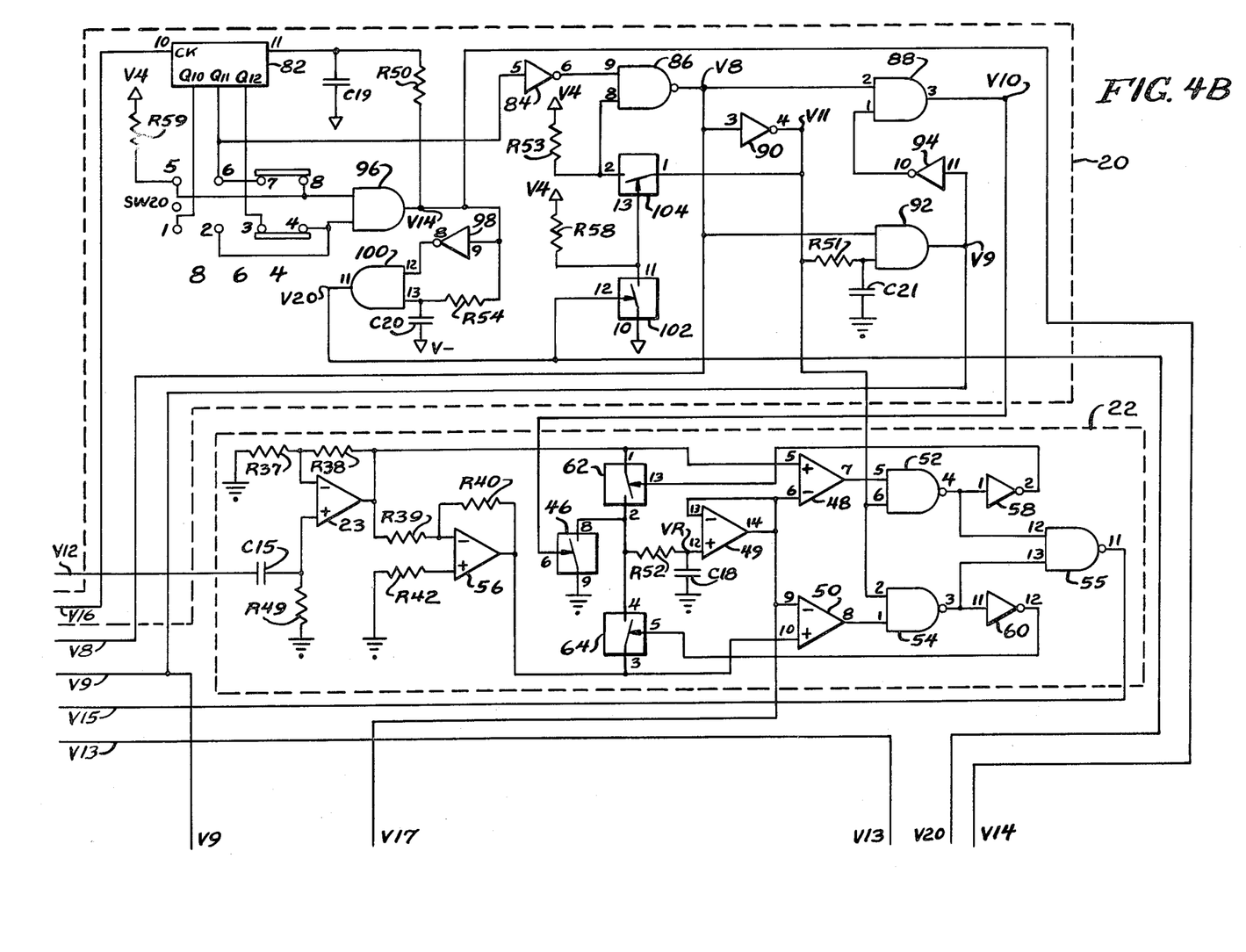
Figure 4C:
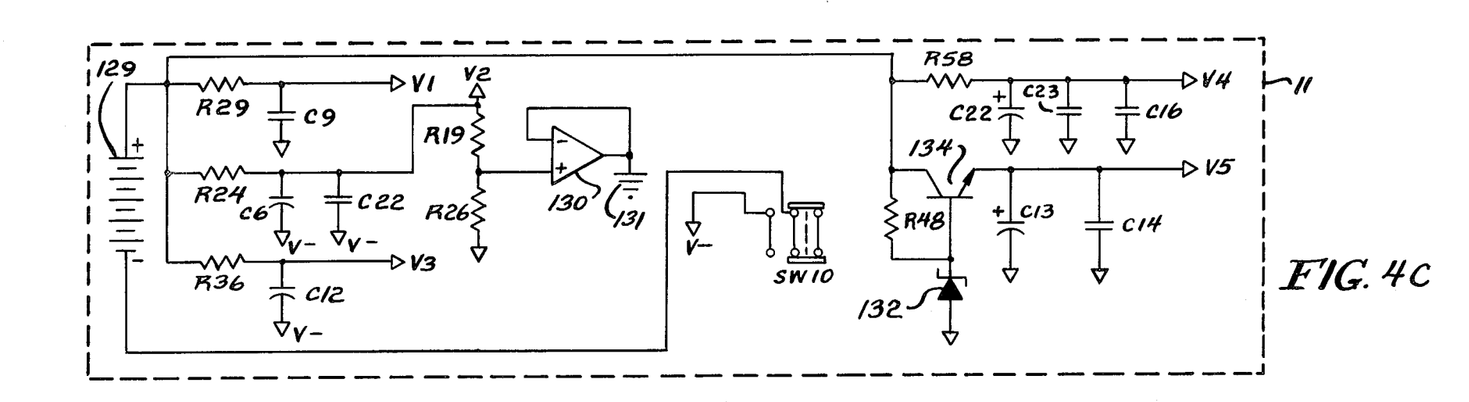

A power supply 11 for tachometers 10 (FIG. 1) and 34 (FIG. 2) may be any of a number of known configurations, including that shown in FIG. 4C. The power supply 11 may include a battery 129 (9 volts), resistors R29 (100), R24 (22), R36 (100), R58 (22), R48 (910), capacitors C9 (0.1), C6 (22), C22 (0.1), C12 (22), C22A (22), C23 (0.1), C16 (0.1), C13 (220), C14 (0.1), a zener diode D6 (1N751), a regulator transistor Q7 (2N222), and an on-off switch SW-10. The power supply 11 produces unregulated output voltages V1, V2, V3 and V4, which are typically about 8.8 volts, and a regulated output V5, which is typically about 4.5 volts. The negative terminal of the battery 129 is designated V—. Resistors R19 (100K) and (100K) are connected between V2 and V— for voltage division. An input of a buffer 130 is connected to the junction of resistors R19 and R26, and the output of the buffer 130 is connected to an analog ground 131 which is at a voltage about midway between the terminals of the battery 129. The analog ground 131 will be referred to generally as ground in this description.

The acoustic tachometer 10 shown in FIGS. 1 and 4A-4D includes the microphone 12 or other transducer which, when held or placed in the vicinity of a diesel engine, detects at least a portion of the sound generated by the engine by producing a systematically related electrical signal. In a tachometer actually made, the microphone was sensitive enough so that it was responsive when held several feet from the engine, which is safe for the operator because there is no need to work close to the fan or the like while the engine is operating.

The microphone 12 should have a substantially flat frequency response across the frequency spectrum of interest for the engine being measured, and is preferably suitable for diesel engines having 4, 6 or 8 cylinders. Many commercially available microphones have the sensitivity and frequency response specifications needed for use in this invention.

The signal generated by the microphone 12 may be amplified in a low-pass filter and amplifier 14, if desired. The amplifier 14 may be any of a number of known configurations, including the one shown in FIG. 4A, which provides a voltage gain of about 32 db over the frequency spectrum of interest of about 20-200 Hz. As shown, the amplifier 14 may include resistors R1 (47K), R2 (13K), R3 (2.7 M) and R5 (62K), capacitors C1 (3.3) and C2 (0.022), and an operational amplifier 47.

The output V6 of the amplifier 14 is passed through the voltage controlled band-pass filter 16, which has a constant bandwidth of about 5 Hz. The filter 16 includes an operational amplifier 116 having a positive input resistor R7 (180K) connected to ground, and a negative input resistor R9 (2.2 M) connected to the output V6 of the amplifier 14. A feedback network connected between the output and the negative input of the amplifier 116 includes a resistor R11 (2.2 M) in parallel with a capacitor C4 (0.015), and an active feedback network which includes cascaded operational transconductance amplifiers 118, 120, and amplifiers 122, 124.

The amplifier 118 includes a positive input resistor R17 (47K) connected to the output of the amplifier 116, a positive input resistor R16 (1K) connected to ground, and a negative input resistor R13 (1K) also connected to ground. The output of the amplifier 118 is connected to the positive input of the amplifier 120. The amplifier 120 includes a positive input resistor R12 (1K) connected to ground and a negative input resistor R10 (1K), also connected to ground.

The amplifiers 118, 120 are operational transconductance amplifiers having respective output currents which are directly proportional to the currents at respective pins 5 and the differential voltage between the inputs of the respective amplifiers. The currents at pins 5 of the respective amplifiers 118, 120 are provided by the output V7 of the sweep generator 18, which is connected to the amplifier 118 through a resistor R21 (43K), and the amplifier 120 through a resistor R23 (43K).

The output of the amplifier 120 is connected to the negative input of the amplifier 122 through a series resistor R4 (75K). The amplifier 122 is an inverter which includes a positive input resistor R8 (39K) connected to ground and a feedback resistor R6 (75K) connected between the output and the negative input of the amplifier 122.

The output of the amplifier 122 is connected to the negative input of the amplifier 124 through a series resistor R15 (220K). The amplifier 124 is an integrator which includes a positive input resistor R14 (220K) connected to ground and a feedback capacitor C3 (0.015) connected between the negative input and the output of the amplifier 124. The output of the amplifier 124 is connected to the negative input of the amplifier 116 through a series resistor R18 (220K), to complete the active feedback network.

The gain of the filter 16 is (R11)/(R9), which is about 1 as shown, the bandwidth is 1/(C4) (R11), which is about 5 Hz as shown, and the center frequency $f_o$ in Hz may be determined from the following equation:

$$f_o^2 = \frac{1}{4\pi^2(R18)(R15)(C4)(C3)} \left( \frac{(19.2)^2(V7 - .6)^2(R16)(R12)(R4)}{(R23)(R21)(R17 + R16)} \right),$$

where R4, R9, R11, R12, R15, R16, R17, R18, R21 and R23 are the resistances of the respective resistors in ohms, C3 and C4 are the capacitances of the respective capacitors in farads, and V7 is the voltage in volts applied to the resistors R21 and R23. In the circuit of FIG. 4A with components having the respective resistances and capacitances mentioned above, $$f_o = 26.9 \, (V7 - 0.6)$$

Thus, the center frequency is a linear function of the control voltage V7 from the sweep generator 18. The gain and bandwidth of filter 16 are constant, and are independent of frequency, as shown above. Use of a variable frequency band-pass filter of fixed narrow pass band permits the entire frequency range of interest to be covered by sweeping the range while reducing random interference which may be caused by loud voices, worn engine parts and the like. The constant bandwidth band-pass filter shown herein thus improves accuracy.

The filter control signal voltage V7 is provided by the sweep generator 18 having the known configuration shown in FIG. 4A, and is designed to sweep the filter 16 through the frequency spectrum of interest. The amplitude of the sweep voltage V7 is functionally related to frequency in the spectrum of interest, including the fundamental frequency of the combustion occurrences, and is therefore related to the operating speed of the engine.

Figure 3:
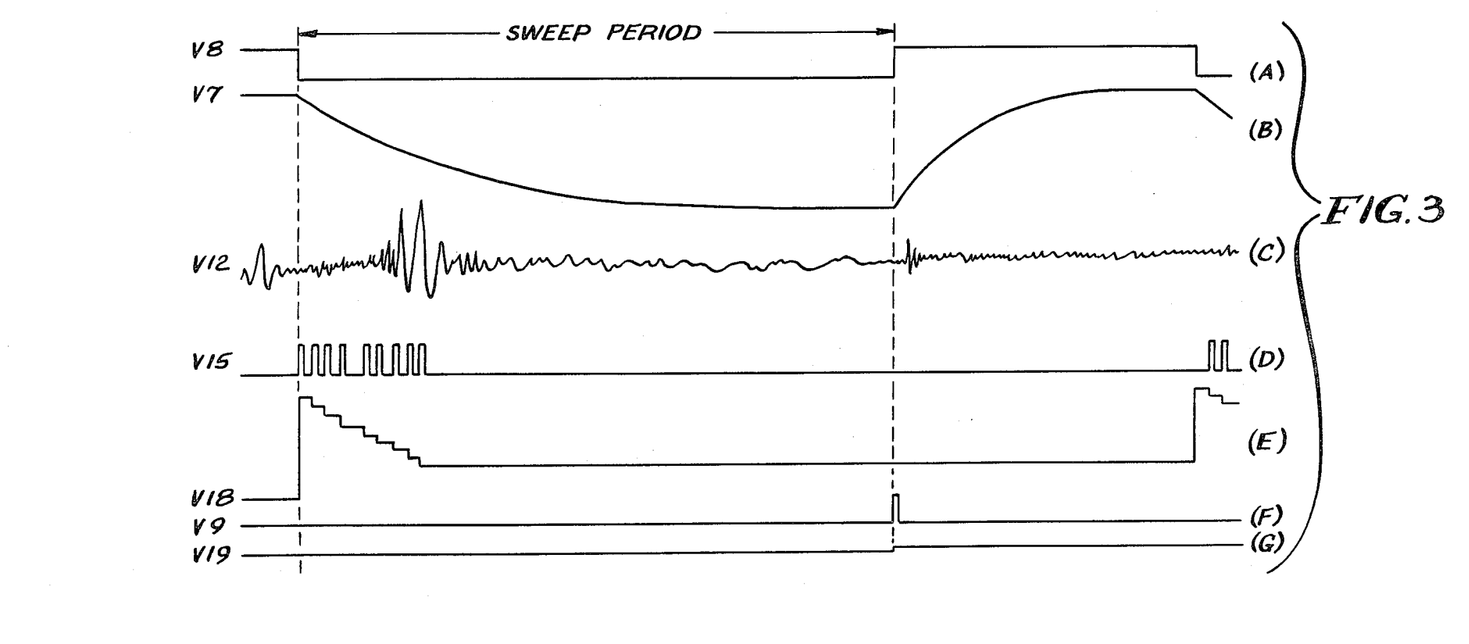
FIG. 3 is a series of waveforms at respective selected points in the tachometers of the embodiments of FIGS. 1 and 2, shown with respect to time.

The sweep generator 18 includes resistors R25 (1 M) and R27 (2.7 M), a capacitor C7 (0.22), a diode D1 (1N4148), and a buffer 51. A pulse from the output V8 of a clock 20 charges the capacitor C7 through the diode D1 and the resistor R25 in parallel with the resistor R27. At the end of the V8 pulse, the diode D1 turns off, and the capacitor C7 discharges through the resistor R27. In this manner, the charge rate is faster than the discharge rate, as seen from FIG. 3B which represents the waveform of the sweep voltage V7.

The voltage V7 may have various linear or nonlinear sweep rates, including the rate for the circuit of FIG. 4A shown in FIG. 3B, which sweeps the filter 16 from the high end of the frequency spectrum of interest to the low end of the spectrum. The sweep is preferably as fast as possible, for more accurate readings. The upper limit on the sweep speed is such that the filter 16 passes with no more than 3 db attenuation at least one peak of each frequency component of the sound generated by the engine, so that each frequency component may be properly analyzed, as will be seen. At lower frequencies, which have longer wavelengths, the sweep rate must be slower than it is at higher frequencies. Thus, the nonlinear sweep shown in FIG. 3B is faster at high frequencies than it is at lower frequencies, to permit an accelerated sweep rate at high frequencies, without a loss of accuracy at low frequencies.

The sweep cycles of the sweep generator 18, and other functions of the circuitry which will be discussed, are controlled by the clock circuit 20, which produces a voltage V9, reset voltage V10 and reset voltage V11 having periodic positive pulses.

The clock 20 (FIGS. 4A and 4B) includes a 1024 Hz oscillator having the generally known configuration shown in FIG. 4A, including an amplifier 81, resistors R33 (464K), R34 (464K), R28 (464K) and R30 (464K), and a capacitor C10 (0.0015). The output V16 of the oscillator controls a binary counter 82 which produces binary outputs at a first output terminal Q10, a second output terminal Q11 and a third output terminal Q12. The output changes incrementally about every 0.5 seconds, until the counter 82 is reset by a pulse at pin 11.

An inverter 84 is connected to the terminal Q11, and the output of the inverter 84 is connected to one input of a NAND gate 86. The other input of the gate 86 is connected to V4 through a series resistor R53 (100K). The output V8 of the gate 86 is connected to one input of an AND gate 88, an inverter 90, one input of an AND gate 92, and the input 94 of the sweep generator 18.

The output V11 of the inverter 90 is connected to an input of the gate 92 through a series resistor R51 (430K). A capacitor C21 (0.022) is connected between that input and ground.

The output V9 of the gate 92 is connected to an inverter 94, and the output of the inverter 94 is connected to an input of the gate 88. The output of the gate 88 is reset voltage V10, and the output of the gate 92 is voltage V9.

One input of an AND gate 96 is connected to terminals SW-20-2 and SW-20-4 of a switch SW-20. The other input of the gate 96 is connected to terminals SW-20-5 and SW-20-8 of the switch SW-20, and to V4 through a series resistor R59 (100K). The output V14 of the gate 96 is connected to the reset terminal 11 of the binary counter 82 through a series resistor R50 (39K), and the latch count terminal 138-5 of a display driver 138. A capacitor C19 (150 pf) is connected between the terminal 82-11 of the binary counter 82 and V−. The output of the gate 96 is also connected to the input of an inverter 98, and an input of an AND gate 100 through a series resistor R54 (39K). A capacitor C20 (68 pf) is provided between the R54 input of gate 100 and V−. The output of the inverter 98 is connected to the other input of the gate 100.

The output of the gate 100 is connected to the control terminal 102-12 of a switch 102. Terminal 102-10 of the switch 102 is connected to V−, and terminal 102-11 thereof is connected to V4 through a series resistor R58 (100K), and to the control terminal 104-13 of a switch 104. Terminal 104-2 of the switch 104 is connected to an input of the gate 86, and terminal 104-1 is connected to the output V11 of the inverter 90. A resistor R53 (100K) is connected between the terminal 104-2 and V4.

The switch SW-20 is a three position slide switch having terminals SW-20-1 through SW-20-8. Terminal SW-20-1 is connected to the terminal Q10 of the counter 82, terminals SW-20-6 and SW-20-7 are connected to the terminal Q11, and the terminal SW-20-3 is connected to the terminal Q12. When measuring the speed of an 8 cylinder engine, the terminal SW-20-5 is connected to the terminal SW-20-6, and the terminal SW-20-1 is connected to the terminal SW-20-2. In this mode, the gate 96 produces an output pulse V14 every 1.5 seconds. V8 is high for about 0.5 seconds, and low for about 1 second. When measuring the speed of a 6 cylinder engine, the terminal SW-20-6 is connected to the terminal SW-20-7, and the terminal SW-20-2 is connected to the terminal SW-20-3. The gate 96 produces an output about every two seconds. V8 is high for about one second, and low for about one second. When measuring the speed of a 4 cylinder engine, the terminal SW-20-7 is connected to the terminal SW-20-8, and the terminal SW-20-3 is connected to the terminal SW-20-4. The gate 96 produces an output about every three seconds in this mode. V8 is high for about two seconds, and low for about one second.

The amplitude of each frequency component of the engine sound as passed by the filter 16 is sampled in the peak detector 22. The peak detector 22 may be responsive to positive peaks of the frequency components, negative peaks, or both positive and negative peaks, as in the circuit shown in FIG. 4B.

The peak detector 22 includes a capacitor C15 (0.1) connected between the output V12 of the filter 16 and the positive input of an amplifier 23. A resistor R49 (750K) is connected between the positive input of the amplifier 23 and ground, and a resistor R37 (100K) is connected between the negative input of the amplifer 23 and ground. A resistor R38 (2.2 M) is connected between the output and negative input of the amplifier 23.

The output of the amplifier 23 is connected to the positive input of a first differential amplifier 48, and the negative input of the amplifier 48 is connected to the output of a buffer 49. The output of the buffer 49 equals the reference voltage VR on a capacitor C18 (0.015), which is connected between the positive input of the buffer 49 and ground. The output of the amplifier 48 is connected to one input of a NAND gate 52.

The negative input of an inverter 56 is also connected to the output of the amplifier 23 through a series resistor R39 (220K). A resistor R42 (110K) is connected between the positive input of the inverter 56 and ground, and a resistor R40 (220K) is connected between the output and the negative input of the inverter 56.

The output of the inverter 56 is connected to the positive input of a differential amplifier 50. The negative input of the amplifier 50 is connected to the output of the buffer 49, and is responsive to the voltage VR on the capacitor C18. The output of the amplifier 50 is connected to one input of a NAND gate 54.

A NAND gate 55 has a first input connected to the output of the gate 52, and a second input connected to the output of the gate 54. The output of the gate 52 is also connected to the input of an inverter 58, and the output of the gate 54 is connected to the input of an inverter 60.

A switch 62 has a control terminal 62-13 which is responsive to the output of the inverter 58, a terminal 62-1 connected to the positive input of the amplifier 48, and a terminal 62-2 connected to the capacitor C18 through a series resistor R52 (20K). A switch 64 has a control terminal 64-5 which is responsive to the output of the inverter 60, a terminal 64-3 connected to the positive input of the amplifier 50, and a terminal 64-4 connected to the capacitor C18 through the resistor R52. A switch 46 has a control terminal 46-6 which is responsive to reset clock pulses V10, a terminal 46-8 connected to the capacitor C18 through the resistor R52 and a terminal 46-9 connected to ground. The second input of the gate 52, and the second input of the gate 54, are connected to reset clock pulses V11.

The peak detector output V15 of the gate 55 controls the first sample and hold circuit 24 (FIG. 4A). A switch 66 has a control terminal 66-5 which is responsive to the output of the gate 55, a terminal 66-4 connected to the output of the generator 18 through a series resistor R20 (20K), and a terminal 66-3 connected to a capacitor C8 (0.015) and an input of a buffer 106.

Figure 2:
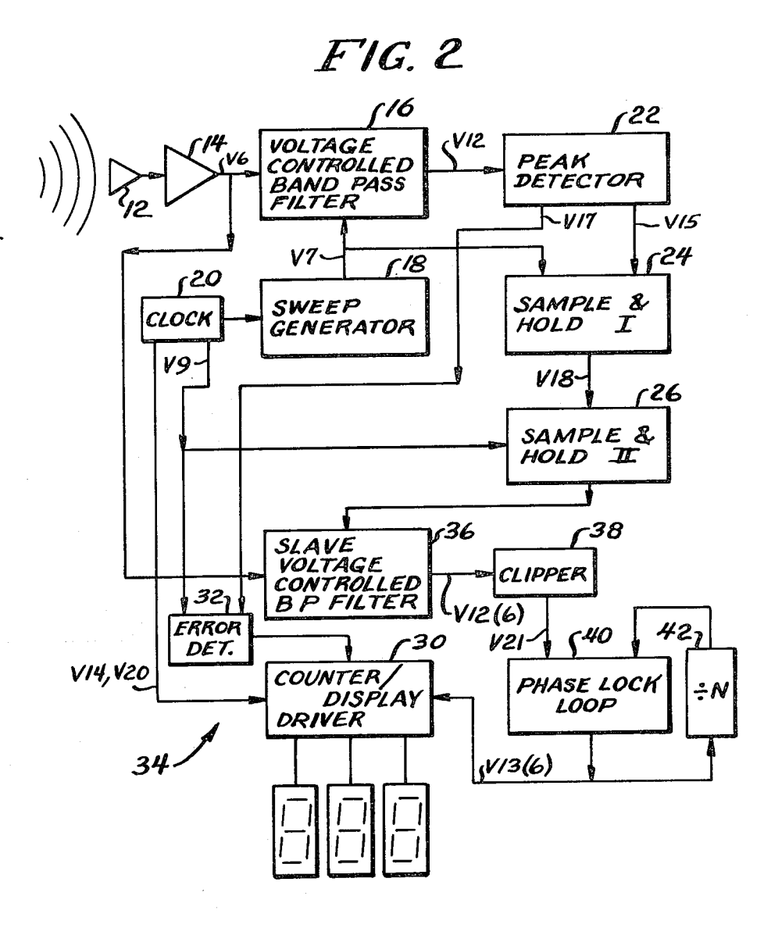
FIG. 2 is a block diagram of an alternative embodiment of an acoustic tachometer in accordance with the present invention.

The output V18 of the buffer 106 is connected to a second sample and hold circuit 26. The circuit 26 includes a switch 70 which has a control terminal 70-13 responsive to the output V9 of the gate 92, a terminal 70-1 connected to the output V18 of the buffer 106 and a terminal 70-2 connected to a capacitor C5 (0.015) and the input of a buffer 108, through a resistor R22 (1K). the output V19 of the buffer 108 is connected to the oscillator 28 (FIG. 1) or a filter 36 (FIG. 2).

The voltage controlled oscillator 28 shown in FIG. 4A is a known circuit having the configuration shown. The oscillator 28 includes an integrated circuit 44 (CD4046BM/CD4046BC), a capacitor C11 (0.022), resistors R32 (30K) and R31 (300K), and a variable resistor R35 (25K).

The output V13 of oscillator 28 is connected to the input of counter-display circuit 30 (FIG. 4D), which is also a known circuit. The display circuit 30 includes the display driver 138, an LED D2, transistors Q2 (2N3904), Q3 (2N3904), and Q4 (2N3904), and display digits 140, 142 and 144.

Figure 4D:
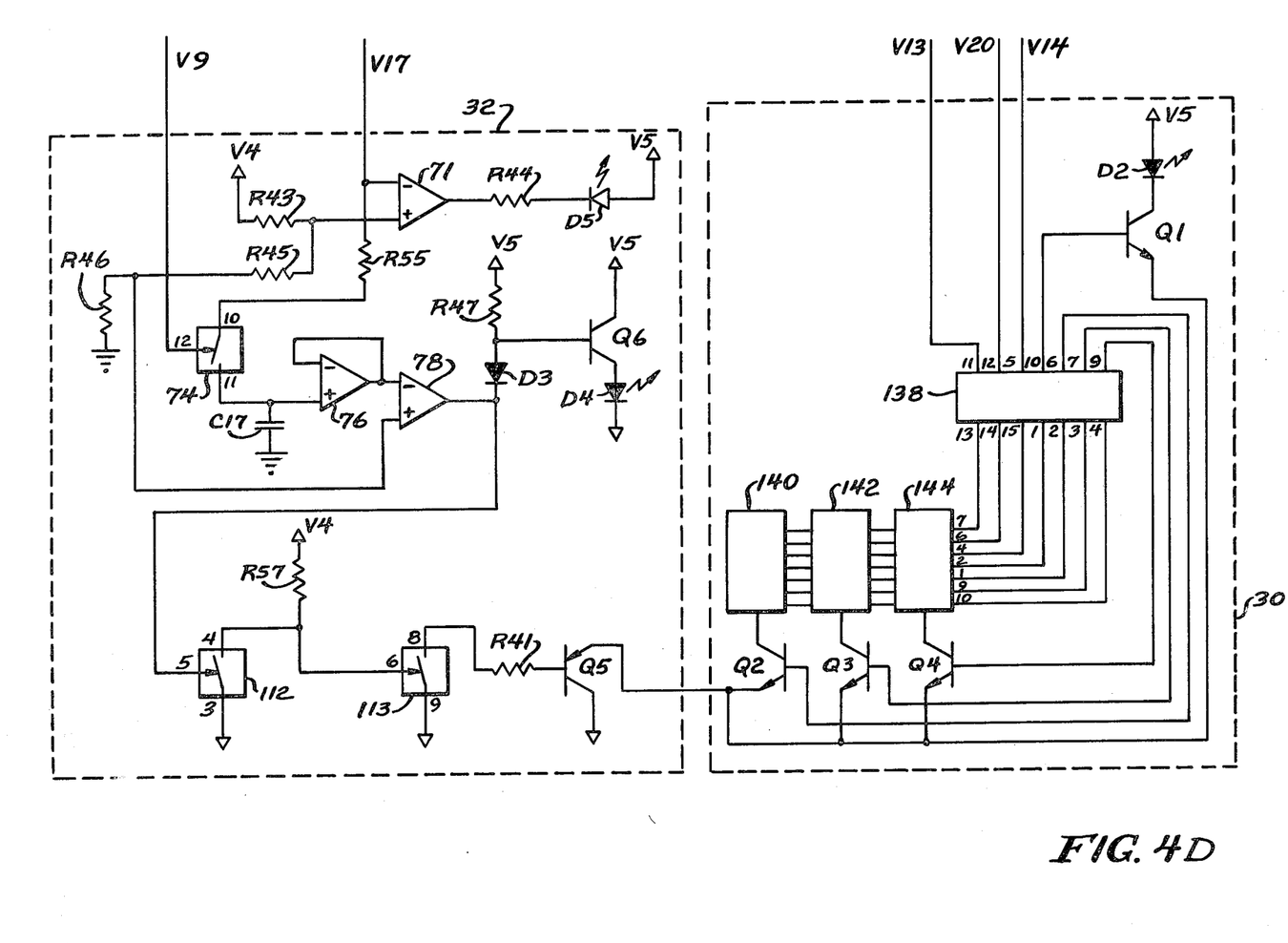
Figure 5:
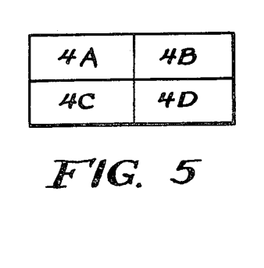
FIG. 5 is a composite view of the manner in which FIGS. 4A—4D go together.

As shown, the circuit 30 will indicate RPM to the nearest 10 RPM. A fourth display digit could be provided, if desired, to measure RPM to the nearest revolution per minute.

An error detection circuit 32, shown in detail in FIG. 4D, includes a voltage divider network having resistors R43 (68K), R45 (220K) and R46 (43K). The negative input of a differential amplifier 71 is connected to the output of a buffer 49 (FIG. 4B), and the positive input of the amplifier 71 (FIG. 4D) is connected to the voltage divider where resistors R43 and R45 connect. The output of the amplifier 71 is connected to the cathode of an LED D5 through a series resistor R44 (470). The anode of the LED D5 is connected to V5.

The error detection circuit 32 also includes a switch 74 having a control terminal 74-12 connected to the output V9 of the gate 92 (FIG. 4B), a terminal 74-10 connection to the output V17 of the buffer 49 through a resistor R55 (1K), and a terminal 74-11 connected to the positive input of a buffer 76. A capacitor C17 (0.015) is connected between the input of the buffer 76 and ground. The output of the buffer 76 is connected to the negative input of a differential amplifier 78. The positive input of the amplifier 78 is connected to the voltage divider where resistors R45 and R46 connect, and the output of the amplifier 78 is connected to the cathode of a diode D3 (1N4148), and the control lead 112-5 of a switch 112. The anode of the diode D3 is connected to V5 through a series resistor R47 (13K) and to the base of a transistor switch Q6 (2N3904). The switch Q6 is connected between the voltage source V5 and the anode of an LED D4. Switch 112 connects V4 through series resistor R57 (100K) and terminal 112-4 to terminal 112-3 and V−. The terminal 112-4 of the switch 112 is also connected to the control lead 113-6 of a switch 113. The switch 113 connects the base of a transistor Q5 (2N3906) through series resistor R41 (1K) and terminal 113-8 to terminal 113-9 and V−. The emitter of the transistor Q5 is connected to the emitters of transistors Q1, Q2, Q3 and Q4, and the collector of the transistor Q5 is connected to V−.

The operation of the circuit elements of the tachometer 10 may be better understood with reference to the waveforms shown in FIG. 3. When clock pulse V8 goes low (FIG. 3A), the sweep generator 18 begins to sweep the filter 16 through the frequency spectrum of interest (FIG. 3B). The differential amplifiers 48 and 50 of the peak detector 22 compare the amplitude of each of the respective positive and negative excursions (FIG. 3C) with the voltage VR, as seen at the output of the buffer 49. If the amplitude of a particular positive excursion exceeds VR, the differential amplifier 48 produces an output. If the output of the amplifier 48 represents a digital high, gate 52 produces an output V15 at gate 55 (FIG. 3D). The gate 52 will also cause switch 62 to close, and the voltage VR will be raised to the voltage of the frequency wave. A similar result is obtained when the amplitude of a negative excursion exceeds VR. At the peak of the excursion, the output of the differential amplifier 48 will be reduced to zero, and the output of the gate 55 will go low. Thus, the output V15 of the peak detector 22 will be a pulse. Every time that the amplitude of an excursion is significantly greater than VR, the peak detector 22 will produce another pulse. When the amplitude of a frequency wave does not significantly exceed VR, no pulse will be produced. Thus, the output V15 will be a series of pulses, the last of which is produced at the maximum amplitude frequency producing the maximum excursion.

Each pulse in the output V15 of the peak detector 22 momentarily turns on the switch 66 of the sample and hold circuit 24, which impresses the output V7 of the sweep generator 18 on capacitor C8, where it is stored. Thus, the output V18 of the buffer 106 (FIG. 3E) stores the voltage V7 at the time of the last pulse from the peak detector 22. At the end of each sweep, the output V18 represents the sweep generator output voltage V7 at the fundamental frequency.

At the end of each sweep, clock pulse V9 (FIG. 3F) momentarily turns on the switch 70, and the output voltage of the buffer 106 (FIG. 3E) appears across the capacitor C5 in the sample and hold circuit 26. The output of the buffer 108 (FIG. 3G) controls the frequency of the oscillator 28 until the next V9 pulse (FIG. 3F).

The display circuit 30 counts pulses from the oscillator 28 between V14 reset pulses, which occur almost simultaneously with the V9 pulses. Since the frequency of the combustion occurrences of a 4 or 6 cylinder engine is lower than that of an 8 cylinder engine operating at the same speed, proportionately more pulses from the oscillator 28 must be counted to convert the fundamental frequency to RPM. For example, the fundamental frequency of the combustion occurrences in an 8 cylinder engine is about 160 Hz at 2400 RPM. The oscillator 28 operates at about 1600 Hz, and oscillator 28 pulses will be counted for 1.5 seconds. The fundamental frequency of a 6 cylinder engine is about 120 Hz at 2400 RPM. The output of the oscillator 28 is about 1200 Hz, which is counted for two seconds. In a 4 cylinder engine, the fundamental frequency is about 80 Hz at 2400 RPM. The oscillator operates at about 800 Hz, which is counted for three seconds. In this manner, the fundamental frequency is converted to RPM for a selected engine size.

The operation of the circuit will now be described in greater detail. Immediately before the start of each pulse from the terminal Q11 of the counter 82 the output V8 of the gate 86 is low, reset voltge V10 is low, reset voltage V11 is high, and voltage V9 is low. The input of the gate 92 which is connected to V11 is high, and the capacitor C21 is charged. When the terminal Q11 goes high, the output of the inverter 84 becomes low, and the output V8 of the gate 86 becomes high. Reset voltage V11 is then low, and the capacitor 21 begins to discharge. For a period of time, however, both inputs of gate 92 are high, and V9 is also high. The low output of the inverter 94 keeps V10 low. When the capacitor C21 discharges, V9 goes low, and the output of the inverter 94 is again high. Reset voltage V10 is then high until the output V8 of the gate 86 becomes low at the end of the pulse from the terminal Q11. V11 also goes high when V8 becomes low.

To summarize, V11 goes low and V9 goes high when the terminal Q11 goes high. V9 is a relatively short pulse, and goes low before the end of the Q11 pulse. V10 goes high from the time that V9 goes low until the end of the Q11 pulse. V11 stays low until the end of the Q11 pulse.

The time length of pulses from Q11, and the time between Q11 pulses depends on the position of the switch SW-20. In the 8 cylinder engine position, gate 96 produces a reset pulse every 1.5 seconds, when both terminals Q10 and Q11 are high. Thus, the terminal Q11 will go high every 1.5 seconds, and will stay high for 0.5 second. In the 6 cylinder engine position, the gate 96 produces a pulse every two seconds, when the terminal Q12 goes high. The terminal Q11 is high for one second, and low for one second. In the 4 cylinder engine position, the gate 96 produces a pulse every three seconds, when both terminals Q11 and Q12 go high. The terminal Q11 is high for one second and low for two seconds.

Each reset pulse from the gate 96 stops the counter-display circuit 30 for a read-out of RPM. Each gate 96 pulse also charges the capacitor C20. At the end of the pulse, the output of the gate 96 is low, the output of the inverter 98 is high, and the output of the gate 100 is high until C20 discharges. The pulse V20 produced by the gate 100 resets the counter-display 30 and turns on the switch 102 briefly. The switch 102 turns off the switch 104, causing V8 to go low, and the capacitor C21 charges.

The manner in which the error detection circuit 32 functions may now be seen. At the start of each Q11 pulse, low reset voltage V11 blocks the output of the peak detector 22 at the gates 52, 54, and V9 turns on the switch 74 (FIG. 4D) and the switch 70 (FIG. 4A). If the reference voltage VR (FIG. 4B) on the capacitor C18 is significantly less than the voltage at the resistor R46, the output of the amplifier 78 will turn on the LED D4, indicating inadequate audio input at the microphone 12. The output of the amplifier 78 will also turn on the switch 112, which will turn off the switch 113. The switch 113 will turn off the transistor Q5, disabling digital displays 140, 142 and 144.

The amplifier 71 (FIG. 4D) constantly monitors the voltage VR for excessive audio inputs, and turns on the LED D5 under that condition, but does not disable the display 30. It is contemplated that the amplifier 71 could be used to disable the display, if desired. Also, either the display disabling feature or the LED indicators could be eliminated, provided that the user has some indication that the tachometer is too close to, or too far away from, the engine, as the case may be.

A V9 pulse also turns on the switch 70 (FIG. 4A), and the output of buffer 106 charges the capacitor C5. The output of the buffer 108 equals the voltage on the capacitor C5, which stores substantially that voltage until the next V9 pulse.

After V9 goes low the switch 70 opens, reset voltage V10 turns on the switch 46, which sets the reference voltage VR on the capacitor C18 at zero. When V8 goes low, the capacitor C7 discharges, and the generator 18 sweeps the frequency spectrum of interest.

As the filter 16 sweeps through the frequency spectrum, the positive portions of the signal cycles are sampled in the amplifier 48, and the negative portions are sampled in the amplifier 50 through the inverter 56. If the voltage at the respective positive input of amplifier 48 or 50 significantly exceeds the value of VR, the gate 52 or 54, respectively, becomes low, which produces a high at V15 through the NAND gate 55. At the same time, the low at the gate 52 or 54 produces a high from the inverter 58 or 60, respectively, and the switch 62 or 64 is turned on. The switch 62 or 64 raises the voltage VR to the positive input voltage of the respective amplifier 48 or 50, and the output of the amplifier 48 or 50 returns to zero. The low output of the amplifier 48 or 50 sets the output of the respective gate 52 or 54 high, and the output V15 low. If the next positive or negative wave is significantly greater than VR, another pulse will be produced at V15 in the manner just described. If the next frequency component has a lower amplitude than VR, a pulse will not be produced. Thus, V15 will be a series of pulses, as seen in FIG. 3D, the last of which will be produced at the sweep voltage producing peak excursion, which corresponds to the fundamental frequency of the combustion occurrences.

The sample and hold circuit 24 measures and stores the sweep generator control voltage V7 across the capacitor C8 each time a V15 pulse from the peak detector turns on the switch 66. Since the last V15 pulse in each cycle corresponds to the control voltage V7 at the fundamental frequency, and the fundamental frequency is a function of RPM, the output of the buffer 106 at the end of each sweep will be functionally related to the operating speed of the engine. When the switch 70 is closed, that voltage will appear at the output of the buffer 108 for further processing. At the end of each sweep, the pulse V9 turns on the switch 70, which stores the voltage V7 at the fundamental frequency on the capacitor C5 in the sample and hold circuit 26 until the next pulse V9.

In the embodiments shown in FIGS. 1 and 4A-4D, the output V19 of the buffer 108 controls the output frequency of a voltage controlled oscillator 28. The output pulses of the oscillator 28, which are related to RPM, are counted over a fixed period of time, and the count is digitally displayed by the counter-display circuit 30. The oscillator 28 may be calibrated by the resistor R35.

Figure 6:
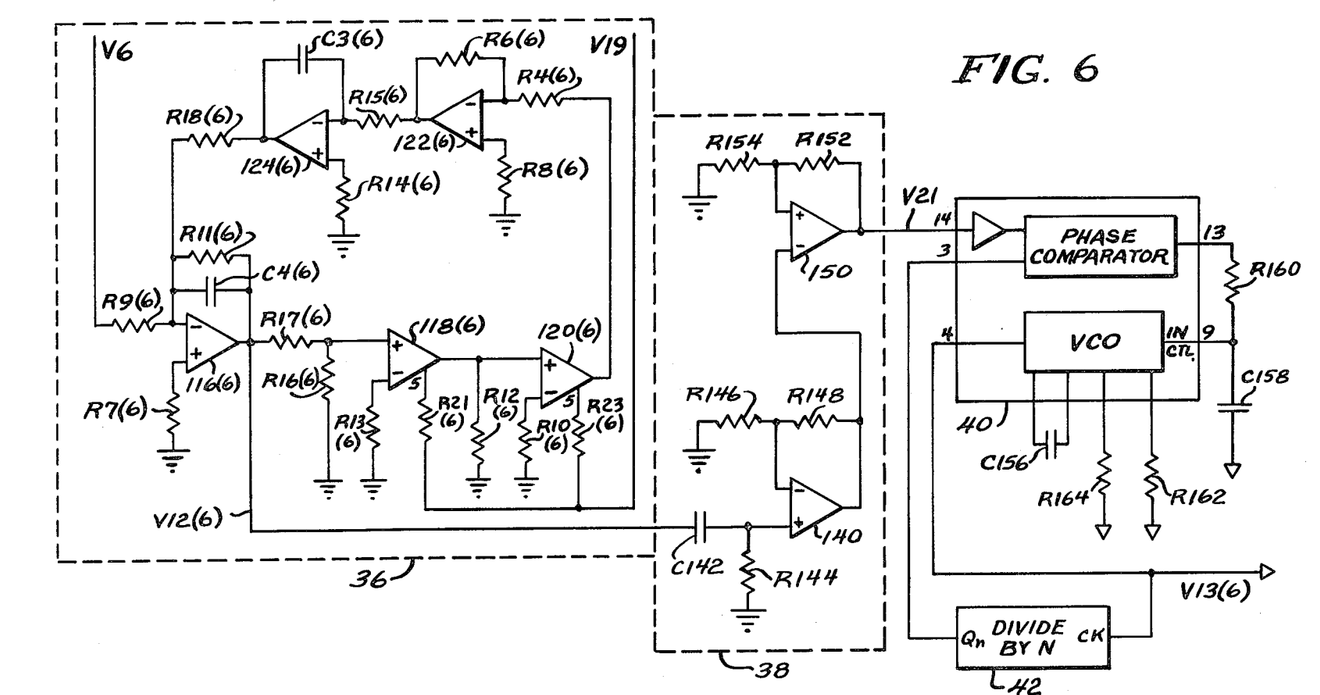
FIG. 6 is a schematic diagram of certain portions of a preferred form of the embodiment shown in FIG. 2.

The embodiment of the tachometer 34 shown in FIG. 2 is similar to that shown in FIG. 1, except that the output V19 of the sample and hold circuit 26, which is the control voltage V7 at the fundamental frequency, controls the center frequency of a second band-pass filter 36. The filter 36 may be similar to the filter 16. The output V6 of the amplifier 14 is connected to the input of the filter 36, and the output V12(6) of the filter 36 is connected to a clipper 38, as seen in FIG. 6. The clipper 38 includes an amplifier 140, an input capacitor C142 (0.01), resistors R144 (750K), R146 (100K), R148 (2.2 M), a clipper 150 and resistors R152 (1 M) and R154 (47K). The output V12(6) of the filter 36 and the output V21 of the clipper 38 have a frequency which is the fundamental frequency of the combustion occurrences. The output V21 of the clipper 38 is fed to a phase locked loop 40 (CD4046BM/CD4046BC) having a divide-by-N circuit 42 which converts the fundamental frequency to RPM. The phase locked loop 40 includes capacitors C156 and C158, and resistor R160, R162 and R164 connected as shown. The phase locked loop 40 drives the counter-display 30, which displays the RPM.

The many advantages of this invention are now apparent. The operating speed of a diesel engine or other device may be determined without a mechanical connection, and without being dangerously close to the engine fan and the like. The tachometer is generally not responsive to extraneous noise, and alerts the operator to possible errors caused by inadequate or excessive inputs.

While the principles of the invention have been described above in connection with specific apparatus and applications, it is to be understood that this description is made only by way of example and not as a limitation on the scope of the claims of this invention.

What is claimed is:

1. Apparatus for measuring the operating speed of a device, said device producing sound waves having components at a number of frequencies, wherein the frequency at which the sound waves are of maximum amplitude is systematically related to said operating speed, said frequency of said maximum occurring in a frequency spectrum of interest which is systematically related to a predetermined range of operating speeds, said apparatus comprising transducer means responsive to said sound waves for producing systematically related electrical signals;
a band-pass filter having a variable center frequency and a narrow pass band for selectively passing the components of said electrical signals having frequencies within said pass band, said variable center frequency corresponding to the amplitude of an applied control signal;
sweep means for applying said control signal to said filter with a varying amplitude for cyclically sweeping said center frequency of said filter through said frequency spectrum of interest;
peak detecting means for selectively detecting the maximum amplitude of the output of said filter during respective sweeping cycles; and
measuring means responsive to said peak detecting means and said sweep means for measuring the amplitude of said control signal when said peak detecting means detects said maximum amplitude, thereby providing an indication of said operating speed.

2. The apparatus of claim 1 wherein said measuring means comprises an oscillator having a frequency which is determined by said control signal at said maximum amplitude, and display means responsive to the frequency of the output of said oscillator for indicating said operating speed.

3. The apparatus of claim 1 wherein said measuring means comprises a second band-pass filter having a variable center frequency and a narrow pass band for selectively passing the components of said electrical signals having frequencies within said pass band, said second filter variable center frequency corresponding to the amplitude of an applied second control signal, means for applying to said second band-pass filter a second control signal of amplitude systematically related to the amplitude of said control signal when said peak detecting means detects said maximum amplitude, and display means responsive to the frequency of the output of said second band-pass filter for indicating said operating speed.

4. The apparatus of any one of claims 1-3 comprising means responsive to said electrical signals for identifying sound waves having an amplitude inadequate for accurate indication of operating speed.

5. The apparatus of any one of claims 1-3 comprising means responsive to said electrical signals for identifying sound waves having an excessive amplitude for accurate indication of operating speed.

6. The apparatus of any one of claims 1-3 wherein said transducer means is responsive to sound waves produced by combustion occurrences in a diesel engine wherein the maximum amplitude of said sound waves is at the fundamental frequency of said combustion occurrences.

7. The apparatus of any one of claims 1-3 wherein said transducer means comprises a microphone.

8. The apparatus of any one of claims 1-3 wherein the width of said narrow pass band of said band-pass filter is substantially constant irrespective of the center frequency.

9. The apparatus of claim 3 wherein the width of said narrow pass band of said second band-pass filter is substantially constant irrespective of the center frequency.

10. The apparatus of claim 1 wherein said band-pass filter comprises an amplifier responsive to the output of said transducer means, and a feedback network comprising a resistor, a capacitor in parallel with said resistor, and an active feedback network in parallel with said resistor and said capacitor, said active feedback network comprising at least one operational transconductance amplifier cascaded with an inverter and an integrator, said operational transconductance amplifier having an output current which is related to said control signal, whereby the center frequency of the pass band of said filter is related to said control signal, and said bandwidth is independent of said center frequency.

11. The apparatus of claim 10 comprising two cascaded operational transconductance amplifiers responsive to said control signal, whereby said center frequency of said pass band is linearly related to said control signal.

12. The apparatus of any one of claims 1–3 wherein said peak detecting means comprises means for storing a reference voltage;

comparison means for comparing signal excursions corresponding to the output of said filter to said reference voltage, and producing an output pulse whenever a said signal excursion significantly exceeds said reference voltage; and a first switching means responsive to said output pulse for setting said reference voltage at the voltage of said filter output when said comparison means produces an output pulse.

13. The apparatus of any one of claims 1–3 wherein said peak detecting means comprises a first differential amplifier having a positive input, a negative input and an output, said positive input being responsive to the output of said filter, said negative input being responsive to a reference voltage source, and said output providing an input to a first NAND gate;

a first inverter responsive to the output of said filter;

a second differential amplifier having a positive input, a negative input and an output, said positive input being responsive to the output of said first inverter, the negative input of said second differential amplifier being responsive to said reference voltage source, and the output of said second differential amplifier providing an input to a second NAND gate;

a third NAND gate having a first input responsive to the output of said first NAND gate, a second input responsive to the output of said second NAND gate, and an output;

a second inverter responsive to the output of said first NAND gate;

a first switch responsive to the output of said second inverter and connected between said positive input of said first differential amplifier and said reference voltage source;

a third inverter responsive to the output of said second NAND gate;

a second switch responsive to the output of said third inverter and connected between said positive input of said second differential amplifier and said reference voltage source;

a third switch responsive to a first periodic clock pulse and connected between said reference voltage source and ground;

the second input of said first NAND gate and the second input of said second NAND gate being responsive to a second periodic clock pulse which precedes said first clock pulse; and a fourth switch responsive to the output of said third NAND gate and connected between said control signal source and said measuring means.

14. A method for measuring the operating speed of a rotating member of a device, said device having a sound output which includes a single frequency at which the sound is of maximum amplitude, said frequency being functionally related to said operating speed and occurring in a frequency spectrum of interest which is functionally related to a predetermined range of operating speeds, comprising the steps of producing electrical signals systematically related to said sound;

applying said electrical signals to a band-pass filter having a variable center frequency and a narrow pass band;

cyclically sweeping the center frequency of said filter through said frequency spectrum of interest by an independent control signal having a known relationship to said operating speed;

detecting the signals of maximum amplitude from the output of said filter during respective sweeping cycles; and measuring said control signal producing said maximum amplitude as an indication of said operating speed.

15. The method of claim 14 wherein said measuring step comprises the step of utilizing said control signal at said maximum amplitude to operate a display indicating said operating speed.

16. The method of claim 14 comprising the step of detecting a sound output having an inadequate amplitude.

17. The method of claim 14 comprising the step of detecting a sound output having an excessive amplitude.

* * * * *

UNITED STATES PATENT AND TRADEMARK OFFICE
CERTIFICATE OF CORRECTION

PATENT NO. : 4,452,079
DATED : June 5, 1984
INVENTOR(S) : Charles R. Tiller

It is certified that error appears in the above-identified patent and that said Letters Patent is hereby corrected as shown below:

Column 5, line 19, after "and" insert --R26--.

Column 9, line 45, "the", first occurrence, should read --The--.

Column 11, line 31, "voltge" should read --voltage--.

Column 13, line 37, "resistor" should read --resistors--.

Signed and Sealed this

Sixth Day of November 1984

[SEAL]

Attest:

Attesting Officer

GERALD J. MOSSINGHOFF

Commissioner of Patents and Trademarks